United States Patent Office

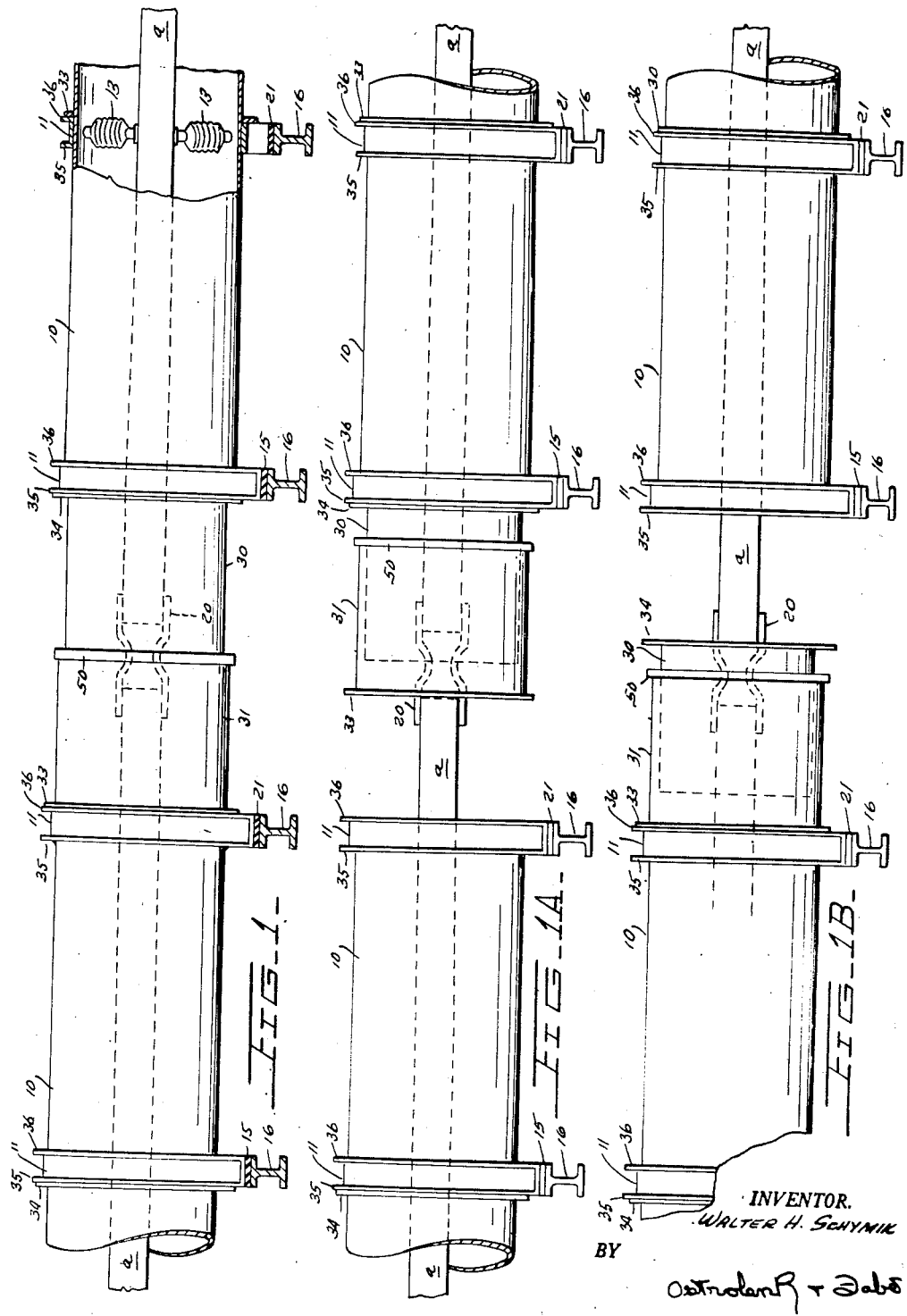

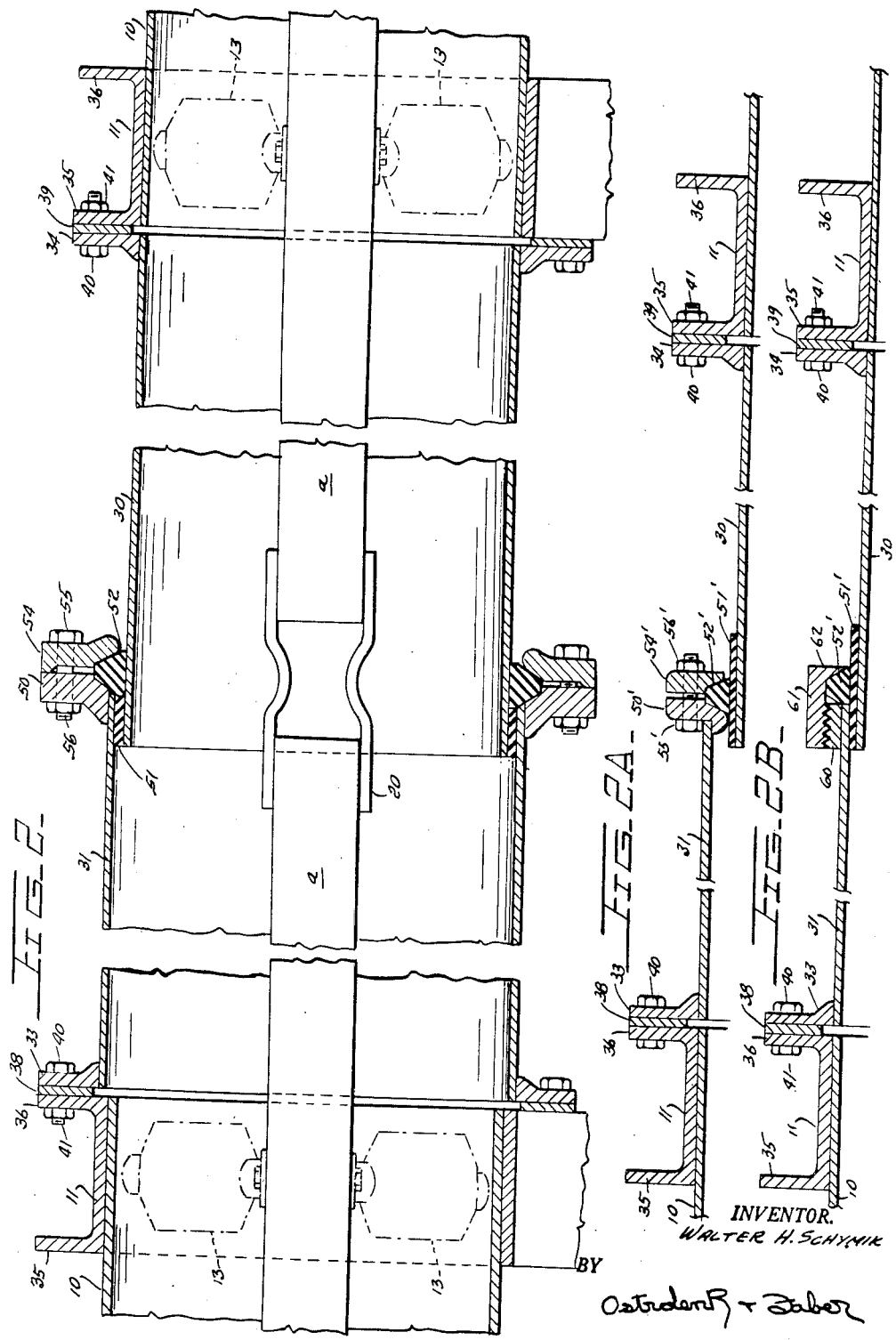

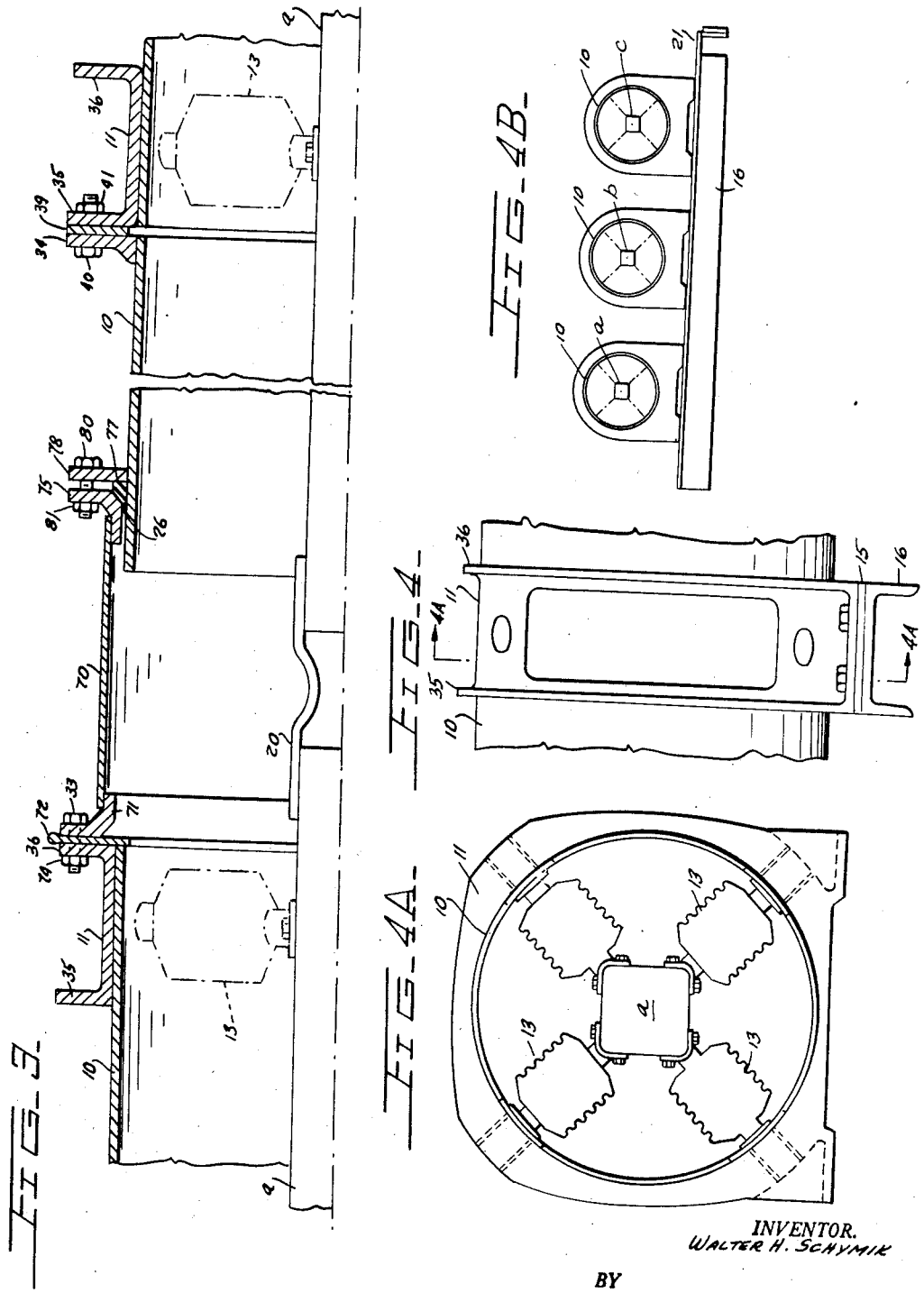

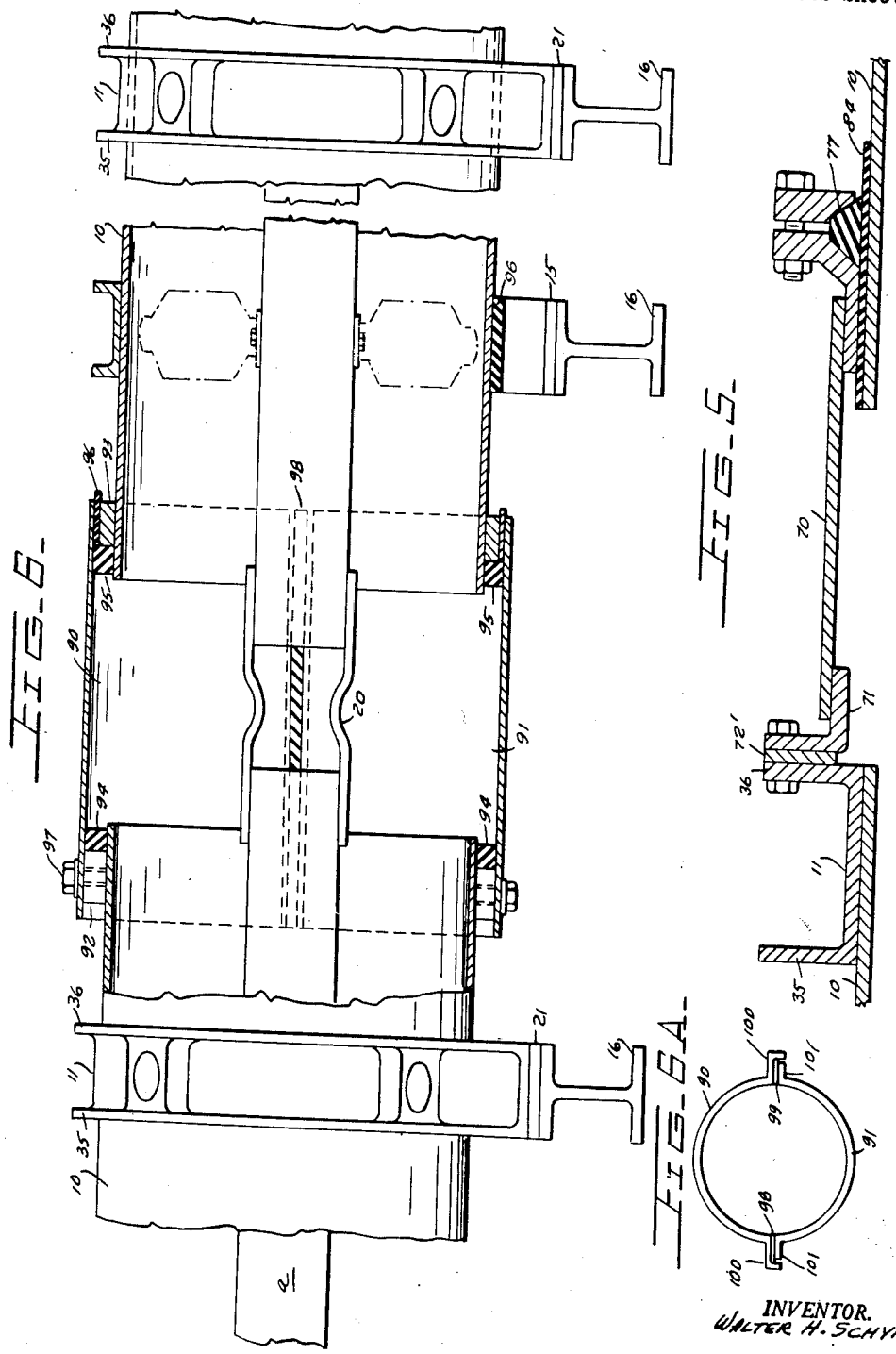

2,783,299
Patented Feb. 26, 1957

2,783,299

WEATHER- AND PRESSURE-TIGHT ENCLOSURE FOR ISOLATED PHASE BUS BAR

Walter H. Schymik, Oreland, Pa., assignor to I-T-E Circuit Breaker Company

Application January 12, 1953, Serial No. 330,875

5 Claims. (Cl. 174—99)

My invention relates to metal enclosed isolated phase bus bar enclosures and is more particularly directed to a weather and pressure-tight enclosure which is adapted to readily enable installation and inspection of the bus run.

In the construction of metal enclosed isolated bus structures, it is essential that the enclosure be water-tight and dust-tight for outer installation. Also, when the enclosed bus run is to be installed in hazardous locations such as areas where there are fumes, gases, steam, etc., it is necessary that the bus run be pressure-tight to insure that the undesirable fumes, gases, steam, etc., will not be drawn into and will be excluded from the enclosure.

In applications where it is desirable to increase the load capacity for a given bus run or where it is desirable to use smaller phase conductors for a given capacity, the bus run is usually cooled by circulating forced air in close proximity to the bus bars as shown in copending application Serial No. 353,301, filed May 6, 1953.

In this type of application, it is essential that the bus enclosure be pressure-tight so that the forced cooling air will not be permitted to flow out of the bus enclosure except at predetermined inlets and outlets. It is also essential in the design and construction of busses and enclosures to insure that same can be constructed and shipped in assembled units to thereby aid and facilitate the installation thereof.

Other design factors which must be considered in the construction of bus runs is to insure that the construction will require a minimum amount of gasket material. Furthermore, it is desirable to not only reduce the amount of gasket material but to provide a construction in which all of the gaskets run in a single direction. For example, perpendicular to the bus run rather than parallel thereto. That is, since clamping means are provided for either transverse or longitudinal connections, it is desirable that the gasket run either longitudinally or transversely.

In addition to providing all of the above-noted features, it is desirable that the enclosure be provided with means which will enable a person to readily and easily inspect the bus run. That is to provide an enclosure which is either slidably or hinge mounted to enable easy access to the bus run.

In the novel bus run enclosure of my invention, I am able to provide a unit which is wetather and pressure-tight, simple in construction so that it may be shipped in assembled units, requires a minimum amount of gasket material and is so constructed that inspection is readily and easily made through a slidable portion of the enclosure.

In my novel invention, the main enclosure or housing for the conductors is a solid welded circular piece. Each housing section is provided with two insulator supporting rings which are welded to the outside of the enclosure with the housing or enclosure extending a short distance to each side of the supporting ring or to the supporting rings.

A plurality of housing sections are mounted with a space between adjacent members which allow access to the conductors, conductor joints and insulators. Several methods of enclosing this space are set forth in my invention.

In one embodiment the space is enclosed by welded sections consisting of two telescoping sections which are provided with 360° gaskets. One of the telescoping enclosures is slightly larger in diameter than the other and the method of sealing between the two sections consists of a flanged ring, welded to the outer telescoping enclosure, against which a suitable gasket material is applied and retained by means of a ring which is pulled up against the flange ring of the outer telescoping enclosure by means of bolts.

With this first embodiment, the telescoping sections can be slipped over the conductor during installation and bolted in place. The enclosure thereby has a minimum of gasket material, all of which is circular with no horizontal or longitudinal gaskets and in no case does one gasket cross over another.

With this arrangement, a weather and pressure-tight enclosure is achieved and by sliding the telescoping sections either to the right or to the left, either set of insulators or conductors can be reached for installation and inspection.

In a second embodiment of my invention, the telescoping members enclosing the space between adjacent housing sections, consists of a single enclosure member which is a solid welded circular piece. This unit, which has a larger diameter than the permanent enclosure, has a flanged ring attached to each end of it. One ring is bolted to the insulator support ring and the second end slides over the permanent enclosure.

The second end is sealed against pressure and weather by circular gasket which is placed between the flange and the permanent enclosure. The gasket is pressed in place by a third ring which is drawn up to the flanged ring by means of bolts, threaded engagement or any other desirable method as set forth in the specification.

In a third embodiment of my invention the enclosure covering the space between the adjacent permanent housings comprises two split half enclosures which are clamped around the solid enclosure with gasket materials positioned between two split halves and around the extended ends of the permanent enclosure. Although this arrangement requires both circular and longitudinal gasket means, it will be noted that the longitudinal gaskets comprise a relatively small percentage of the entire gasket length.

In the embodiments noted above, the enclosures covering the space between the solid permanent housings can be readily and easily unbolted so that same can be slid over the permanent solid housing to enable rapid and easy inspection of the insulators and conductors.

Accordingly, a primary object of my invention is to provide an enclosure for bus runs which is weather and pressure-tight and enables easy inspection of the bus run.

Another object of my invention is to provide a novel enclosure having a bus run, having all the gaskets placed in one direction.

Still another object of my invention is to provide a novel bus system which can be cooled by forced air to thereby increase its capacity since the enclosure will not permit the forced air to flow out of the bus enclosure except at predetermined inlets and outlets.

Another object of my invention is to provide a bus enclosure arrangement with a slidable enclosure section which enables rapid and easy inspection of the conductors, insulators, and conductor connections.

Still another object of my invention is to provide a simple construction for bus assembly so that the unit may be shipped in assembled parts.

A still further object of my invention is to provide an embodiment for bus run enclosures in which the space between adjacent solid welded housing sections is enclosed by two telescoping sections.

Another object of my invention is to provide an enclosure arrangement having telescoping sections enclosing the space between adjacent solid housing sections in which all of the gaskets required to achieve a water and pressure-tight seal, are circular.

A further object of my invention is to provide a novel enclosure unit which can be moved to and in a path which is concentric with the housing and conductors of the bus run to enable inspection of the conductors, insulators and conductor connections.

Another object of my invention is to provide an arrangement wherein a single enclosure covers the space between adjacent solid housing sections so that sealing of the conductors can be achieved with circular gaskets, and permits inspection of the bus run by sliding the solid enclosure over the housing sections.

Another object of my invention is to provide two split half enclosures in the space between adjacent solid housing sections.

These and other objects of my invention will be apparent from the following description when taken in connection with the drawings in which:

Figure 1 is a side view, showing the positioning of telescoping enclosures in the space between adjacent welded housing sections.

Figure 1a is a side view similar to Figure 1, showing the position of the outer telescoping enclosure with respect to the inner telescoping enclosure when the former is moved to the right to enable inspection of the conductor, conductor connections and insulating supports.

Figure 1b is a side view similar to Figure 1, showing the position of the inner and outer telescoping parts when the inner telescoping part is moved to the left to enable a person to gain access to the conductor, conductor connections and insulators which support the conductor to the right.

Figure 2 is a cross sectional view of Figure 1, showing the details of the construction and connection of telescoping members and also illustrates the position of the various circular flanges which are used with this embodiment.

Figure 2a shows a modification of the clamping connection between the two telescoping parts.

Figure 2b is another modification for the connection between the outer and inner telescoping enclosures.

In this modification, the two units are secured together for water and pressure-tight seal and insulated from each other by means of a threaded ring rather than a nut and bolt arrangement, as shown in the arrangement of Figure 2 and the modification of Figure 2a.

Figure 3 is a cross sectional view showing a second embodiment of my invention wherein the space between the adjacent solid housing sections is enclosed by a single solid circular enclosure unit.

Figure 4 is a side view of a portion of one housing section with the insulator support ring attached thereto.

Figure 4a is a side view of the insulator support ring used for an isolated phase bus run and is taken along the line 4a—4a of Figure 4.

Figure 4b is a schematic representation of the positioning of the various phases of the bus run using the insulating supports of Figure 4a.

Figure 5 shows a modification of the conductor connection between the solid enclosure and one housing section.

Figure 6 is an illustration of another embodiment of my invention showing two split half covers to enclose the space between adjacent solid housing sections.

Figure 6a is a sectional view of Figure 6.

Referring now to Figures 1, 2, 4, 4a and 4b, the main enclosure for the bus conductors a, b and c, comprises the housing sections 10. The housing sections 10 is a 360° hollow cylindrical solid section which is welded together to eliminate the necessity of any longitudinal gaskets.

U-shaped annular insulator support members 11 support the housing 10 and are placed near the ends thereof as seen in Figure 1.

The conductors a, b and c, are supported within the housing 10 by insulators 13 which are supported and secured to the insulator support members 11, as seen in Figure 4a.

The entire structure, including the housing sections 10 and the insulator support members 11, is supported on bracket 16 and insulated therefrom by insulator 15, as seen in Figures 1 and 4. That is, all of the support rings 11 which are positioned on the left end of the one piece welded housing section 10, are insulated from the support 16. However, as best seen in Figure 1, the support brackets 11, which are positioned on the right end of the welded housing sections 10, are electrically connected to ground bus 21 to thereby insure that each section of the housing is properly grounded. As will hereinafter be more fully described, the portion of the telescoping members adjacent each housing section, is electrically connected thereto with means to provide electrical insulation between adjacent telescoping members so that all parts of the enclosures and housing are properly grounded.

As seen in Figure 1, the conductor a, will extend passed the end of the one piece housing 10 and adjacent conductors may be connected together by means of straps 20 or in any other desirable manner.

My invention relates to the manner and means in which the space between the adjacent welded housing sections 10 can be appropriately enclosed to insure a weather and water-tight seal, and also enable easy access to the conductors and insulators.

In order to achieve the above, I provide telescoping enclosures 30—31. Each of the enclosures 30—31 are hollow cylindrical members which are welded together to form a solid 360° enclosure, thereby eliminating the necessity of a longitudinal gasket.

The enclosure section 31 has a slightly larger diameter than the enclosure section 30 so that the latter unit may fit internal of the former, as seen in Figures 1 and 2.

As thus seen in the detailed view of Figure 2, the enclosure section 31 is provided with a flange ring 33 which is welded to one end thereof and the enclosure section 30 is provided with a similar flange ring 34 which is welded to the outer periphery.

Each of the telescoping sections 30—31 are respectively secured to the leg 35—36 of the U shaped annular insulator support members 11.

Metalic gaskets 38—39 are positioned between the leg 36 and the annular flange 33 of enclosure 33 and leg 35, and annular flange 34 of enclosure section 30 respectively. Metalic gasket 38—39 extend for 360°.

A plurality of bolts and nuts 40—41 are provided to secure the enclosure section 31 to the leg 36 through the flange 35 and to secure the enclosure section 30 to the flange 35 by means of the flange 34. Thus it will be seen that after the telescoping enclosure sections 30—31 are secured in position, the metalic gaskets 38—39 will insure that the section 31 is at the same potential as the housing section 10 on the left and also insure that the enclosure section 30 will be at the same potential as the housing section 10 on the right.

As heretofore noted, each housing section 10 is maintained at grounded potential by means of ground busses 31 and hence, the metalic gasket 38—39 will insure that the telescoping sections 30—31 are also at ground potential.

One method of securing the enclosure section 31 to the enclosure section 30 is shown in Figure 2. In this arrangement, a gasket compression ring 50 is welded to the end of the enclosure section 31 opposite the flange 33. Insulation means 51 is sandwiched between the enclosure 30—31 and forms a complete 360° circle.

A substantially triangular cross section circular gasket 52 is positioned between the cooperating gasket compression rings 50—54.

It will be noted that the gasket compression ring 54 is independent of both of the enclosures 30—31. This latter ring 54 is secured to the gasket compression ring 50 by means of a plurality of nuts and bolts 55—56 which are positioned and spaced around the circumference of these rings. Hence, by tightening up on the nut and bolts 55—56, the gasket compression ring 50—54 will be drawn together, thereby urging the circular gasket 52 against the enclosure 30—31 to provide a pressure and water-tight sealing.

In view of the fact that the insulator section 51 is sandwiched between the sections 30—31, these two units will not be electrically tied together at this point.

Thus it will be seen that the circular metalic gasket 39 serves a dual function of electrically tying the inner telescoping enclosure 30 to the housing section 10 on the right and also in that there will be a pressure and water-tight seal therebetween.

The metalic gasket 38 also serves a dual function of electrically tying the outer telescoping enclosure 31 to the housing section 10 at the left and insures that there will be a water seal therebetween.

With respect to the outer telescoping enclosure 31 to the inner telescoping enclosure 30, the circular gasket 52 will insure a water and pressure-tight seal therebetween and the circular insulating means 51 will insure that these two units are not electrically tied together.

In the event it is desired to inspect the conductor, connector 20, and insulators 13 associated with the support bracket 11 at the left of Figure 2, the plurality of nuts and bolts 40—41, which tie the circular flange 33 to the leg 36, are loosened and removed. After the nuts and bolts 40—41 are removed from the circular flange 33 and leg 36 of the insulating support unit 11, the plurality of nuts and bolts 55—56 are removed from the gasket compression rings 50—54 to thereby permit removal of insulating circular gasket 52.

Thus the operator can slide the outer telescoping enclosure 31 to the right, thereby covering the inner telescoping enclosure 30, as seen in Figure 1a.

After the inspection is made and it is desired to return the telescoping enclosures to the position of Figure 1, the outer telescoping section 31 is moved from the position of Figure 1a to the left.

After a circular insulating gasket 52 is positioned between the gasket compression rings 50—54 and a circular metalic gasket 38 properly positioned between the circular flange 33 and the leg 36, the nuts and bolts 40—41 and 55—56 can be positioned and tightened to thereby properly seal the outer enclosure 31 in position, as heretofore noted.

In the event it is desired to inspect the insulators 13, which are associated with the support unit 11 on the right, then the operator need only remove the plurality of nuts and bolts 40—41, associated with the circular flange 34—35 and the plurality of nuts and bolts 55—56, associated with the gasket compression rings 50—54 and remove the circular gasket 52. Thus it will be possible to slide inner telescoping enclosure 30 to the left so that it is in the position shown in Figure 1b. Hence the operator can readily and easily inspect the conductor $a$, the strap connectors 20 and the insulators 13, associated with the support unit 11 at the right.

Figure 2a illustrates a modification which can be used in order to obtain a pressure and water-tight seal between the outer and inner telescoping enclosures 31—30 and still insure that these two units are not electrically tied together. In this modification of Figure 2a, the insulating paint or material $51^1$ is baked on the outer circumference of the inner telescoping enclosure 30 at the opposite end of the welded flange 34.

The gasket compression ring $50^1$ is welded to the outer telescoping enclosure 31 in any desirable manner. For example, by welding. A circular gasket $52^1$ is sandwiched between the gasket compression ring $54^1$ and $50^1$.

It will be noted that the compression ring $54^1$ is not attached to either the outer or inner telescoping enclosures 30 or 31. A plurality of bolts and nuts $55^1$ and $56^1$, which are spaced and positioned around the circumference of the compression rings $50^1$ and $54^1$ are tightened to thereby insure a water and pressure-tight seal and at the same time, insuring that the enclosure 31 will be electrically insulated from the enclosure 30.

In the modification of Figure 2b, the outer telescoping enclosure 31 is provided with a ring 60, which is permanently secured at the end opposite the connection of the flange 33. The ring 60 is provided with a plurality of circular teeth in its outer circumference. The inner telescoping enclosure 30 is provided with an insulating paint or material $51^1$, which is baked on one end thereof opposite the end to which the flange 34 is secured, in substantially the same manner as set forth in the modification of Figure 2a.

A circular gasket $52^1$ is used, and is as substantially set forth in Figure 2a.

A ring 61, having a plurality of circular teeth on the internal circumference thereof and an extension 62, to grip the circular gasket $52^1$, is threadably engaged with the teeth of the circular ring 60. Hence by threading the ring 61 so that it goes to the left, the gasket $52^1$ can be comprised to form a pressure-tight seal between the outer and inner telescoping members 31 and 30.

A second embodiment for enclosing the space between adjacent housing sections 10, is shown in Figure 3. In this embodiment, a single slip cover 70 is used instead of telescoping sections, as set forth in the embodiment of Figure 1. The slip cover 10 is a hollow cylindrical member which is welded together to form a 360° solid unit, thereby eliminating the need for longitudinal gaskets.

The left end of the slip cover 70 is provided with a bolt ring 71 which is welded thereto. A circular gasket 72 is positioned between the bolt ring 71 and the leg 36 of the insulating support unit 11. A plurality of nuts and bolts 73—74 are spaced around the circumference of the bolt ring 71 and the leg 34 to secure these units to each other. The bolt 73 is made as an insulating unit to insure that there will be no conductive path between bolt ring 71 and the bracket 11.

The opposite end of the slip cover 70 is provided with a bolt ring 75, similar to bolt ring 71 and welded thereto. The bent portion of the bolt ring 75 is provided with a metal coating 76 to insure that there will be a conductive path between the slip cover 70 and the housing section 10 (on the right), through the bolt ring 75 and the metal coating 76.

A gasket 77, which can be metallic, is sandwiched between the ring 78 and the bolt ring 75. A plurality of nuts and bolts 80—81 are positioned around the circumference of these two rings to seal the ring 78 to the bolt ring 75. When the nuts and bolts 80—81 are securely tightened, the gasket 77 will be properly sandwiched between the connecting units to insure that there will be a weather and pressure-tight seal therebetween.

In the event it is desired to inspect the conductors, the operator need only remove the plurality of nuts and bolts 73—74, 80—81 and slide the slip cover 70 to the right, thereby gaining access to the interior of the housing in substantially the same manner as shown in Figure 1a.

Several modifications for the connection of the slip cover 70 are shown in Figure 5. In the Figure 5, the gasket 72, sandwiched between the bolt ring 71 and leg 36, is replaced by a metallic gasket $72^1$. Also in this modification, an insulating means 84 is positioned around the outer circumference in one end of the housing section 10 to insure that there will be no conductive path between the slip cover 70 and the housing section 10, which is at the right. Hence in this modification, the slip cover 70 is electrically tied to the housing section 10, which is to the left rather than to the housing section 10 at the right.

It will be noted that the slip cover 70 can be secured to the housing section 10 (at the right), in substantially the same manner as set forth in Figure 2b. That is, a threaded engagement between a ring permanently secured to the enclosure 70 and a compression ring can be used to obtain a pressure-tight seal.

In a fourth embodiment of my invention shown in Figures 6 and 6a, the space between adjacent housing sections 10 can be enclosed by two split half covers 90—91.

In this arrangement, rings 92 and 93 are welded at the ends of the housing sections 10. Circular gaskets 94 and 95 are positioned adjacent the rings 92 and 93 respectively at the ends of the housing sections 10. The ring 93 is provided with a circular insulation member 96 to insure that the split half covers 90 and 91 will not be in conductive relation with the housing section 10 which is at the right.

A plurality of screws 97 are secured in appropriate openings in the ring 92 to thereby secure the half sections 90—91 to the housing sections 10 and 11 at the right and at the left. A conductive path will be maintained from the housing section 10 which is at the left, through the ring 92 to both split half covers 90 and 91 to insure that these two units will be properly grounded through the grounding bus 21.

It will be noted, that with this arrangement, two longitudinal gaskets 98 and 99, as seen in the schematic view of Figure 6a, will be positioned between the extending flanges 100—101 of the split half covers 90—91 to insure a pressure and water-tight seal.

It will be noted that with this arrangement, when it is desired to inspect the conductors the screws 97 may be removed to thereby permit the split half covers 90—91 to either be removed or slid over the housing sections 10 to gain access to the interior of the enclosure. Thus it will be seen that I have provided novel arrangements for bus enclosures wherein it is possible to obtain a pressure and water-tight seal, and have also provided a novel arrangement whereby rapid and easy access to the interior of the enclosure is possible.

In the foregoing, I have described my invention only in connection with preferred embodiments thereof. Many variations and modifications of the principles of my invention within the scope of the description herein are obvious. Accordingly, I prefer to be bound not by the specific disclosure herein but only by the appending claims.

I claim:

1. In a bus structure comprising conductors, insulators, insulator supports, housing sections and enclosure means; said insulator supports supporting said insulators, said conductors and said housing sections; one of said insulator supports being positioned adjacent each end of each of said housing sections and mounted concentrically on said housing sections; said insulator support at one end of said housing section being connected to a grounding bus, said housing section being a hollow cylindrical member and welded together to form a 360° tube; said conductors extending beyond the ends of said housing sections; said housing sections positioned in alignment with a space between adjacent ends thereof; said enclosure means enclosing said space between said housing sections with one end of said enclosure means positioned adjacent said insulators; said enclosure means being removably secured to said housing sections to permit slidable movement with respect thereto; circular gaskets between said enclosure means and said housing sections to render the combination water and pressure-tight; said enclosure means comprising telescoping sections; said telescoping sections secured to said insulating supports; each of said telescoping sections being slidable with respect to the other to enable easy access to the interior of said bus structure and said insulators.

2. In a bus structure comprising conductors, insulators, insulator supports, housing sections and enclosure means; said insulator supports supporting said insulators, said conductors and said housing sections; one of said insulator supports being positioned adjacent each end of each of said housing sections, and mounted concentrically on said housing sections; said insulator supports at one end of said housing sections being connected to a grounding bus; said housing sections being a hollow cylindrical member and welded together to form a 360° tube; said conductors extending beyond the ends of said housing sections; said housing sections positioned in alignment with a space between adjacent ends thereof; said enclosure means enclosing said space between said housing sections; said enclosure means being removably secured to said housing sections to permit slidable movement with respect thereto with one end of said enclosure means positioned adjacent said insulators; circular gaskets between said enclosure means and said housing sections to render the combination water and pressure-tight; said enclosure means comprising telescoping sections; said telescoping sections secured to said insulating supports; each of said telescoping sections being slidable with respect to the other to enable easy access to the interior of said bus structure and said insulators; and a circular gasket between said telescoping sections to insure a water and pressure-tight connection therebetween.

3. In a bus structure comprising conductors, insulators, insulator supports, housing sections and enclosure means; said insulator supports supporting said insulators, said conductor, and said housing sections; one of said insulator supports being positioned adjacent each end of each of said housing sections and mounted concentrically on said housing sections; said insulator supports at one end of said housing sections being connected to a grounding bus; said housing section being a hollow cylindrical member and welded together to form a 360° tube; said conductors extending beyond the ends of said housing sections; said housing sections positioned in alignment with a space between adjacent ends thereof; said enclosure means enclosing said space between said housing sections with one end of said enclosure means positioned adjacent said insulators; said enclosure means being removably secured to said housing sections to permit slidable movement with respect thereto; circular gaskets between said enclosure means and said housing sections to render the combination water and pressure-tight; said enclosure means comprising telescoping sections; said telescoping sections secured to said insulating supports; each of said telescoping sections slidable with respect to the other to enable easy access to the interior of said bus structure and said insulators; a circular gasket between said telescoping sections to insure a water and pressure-tight connection therebetween; a threaded ring secured to one of said telescoping sections; and a second ring in threaded engagement with said first mentioned threaded ring to compress said circular gasket.

4. In a bus structure comprising conductors, insulators, insulator supports, housing sections and enclosure means; said insulator supports supporting said insulators, said conductors and said housing sections; one of said insulator supports being positioned adjacent each end of each of said housing sections and mounted concentrically on said housing sections; said insulator supports at one end of said housing sections being connected to a grounding bus; said housing sections being a hollow cylindrical member and welded together to form a 360° tube; said conductors extending beyond the ends of said housing sections; said housing sections positioned in alignment with a space between adjacent ends thereof; said enclosure means enclosing said space between said housing sections with one end of said enclosure means positioned adjacent said insulators; said enclosure means being removably secured to said housing sections to permit slidable movement with respect thereto; circular gaskets between said enclosure means and said housing sections to render the combination water and pressure-tight; said enclosure means comprising telescoping sections; said telescoping sections secured to said insulating supports; each of said telescoping sections slidable with respect to the other to enable easy access to the interior of said bus structure and said insulators; a circular insulated means permanently secured to one end of one of said telescoping sections; a circular gasket and gasket compression rings; said circular gasket and said circular insulating means positioned between the overlapping areas of said telescoping sections; said gasket compression rings compressing said circular gaskets to render said connection between said telescoping sections water and pressure-tight.

5. In an isolated phase bus structure comprising conductors, insulators, insulator supports, housing sections and enclosure means; said insulator supports supporting said insulators, said conductors, and said housing sections; one of said insulator supports being positioned at each end of each of said housing sections and mounted concentrically on said housing sections, said insulator support at one end of said housing section being connected to a grounding bus, said housing section being a hollow cylindrical member and welded together to form a 360° tube; said conductors extending beyond the ends of said housing section, said housing sections being positioned in alignment with a space between ajacent ends thereof, said enclosure means enclosing said space between said housing sections with one end of said enclosure means positioned adjacent said insulators; said enclosure means being removably secured to said housing sections to permit access to the interior of said housing sections and said insulators; circular gaskets between said enclosure means and said housing sections to render the combination water and pressure-tight; said enclosure means comprising a slip cover; said slip cover being a hollow cylindrical member welded together to form a 360° tube; said slip cover having a bolt ring integrally secured to each end thereof; said slip cover being connected to said housing sections by means of said bolt rings.

References Cited in the file of this patent

UNITED STATES PATENTS

| | | |
|---|---|---|
| 1,752,475 | Ashworth | Apr. 1, 1930 |
| 2,044,580 | Leach | June 16, 1936 |
| 2,293,310 | Rudd | Aug. 18, 1942 |
| 2,422,502 | Schrader | June 17, 1947 |
| 2,452,847 | Frei | Nov. 2, 1948 |
| 2,454,838 | Richardson | Nov. 30, 1948 |
| 2,469,445 | Scott | May 10, 1949 |
| 2,531,017 | West | Nov. 21, 1950 |
| 2,532,773 | Kellam | Dec. 5, 1950 |